(12) United States Patent
Lin et al.

(10) Patent No.: US 10,355,603 B2
(45) Date of Patent: Jul. 16, 2019

(54) CONTROL CIRCUIT FOR POWER CONVERTER WITH ISOLATED OR NON-ISOLATED FEEDBACK

(71) Applicant: SEMICONDUCTOR COMPONENTS INDUSTRIES, LLC, Phoenix, AZ (US)

(72) Inventors: Mao-Sheng Lin, New Taipei (TW); Chen-Hua Chiu, New Taipei (TW); Guangchao Zhang, San Jose, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 15/673,646

(22) Filed: Aug. 10, 2017

(65) Prior Publication Data

US 2018/0054131 A1 Feb. 22, 2018

Related U.S. Application Data

(60) Provisional application No. 62/375,982, filed on Aug. 17, 2016.

(51) Int. Cl.
*H02M 3/335* (2006.01)
*H02M 1/00* (2006.01)

(52) U.S. Cl.
CPC ... *H02M 3/33523* (2013.01); *H02M 3/33507* (2013.01); *H02M 2001/0025* (2013.01)

(58) Field of Classification Search
CPC ........................................ H02M 3/335–3/3388
See application file for complete search history.

(56) References Cited

U.S. PATENT DOCUMENTS

2016/0181928 A1* 6/2016 Kok .................. H02M 3/33523
363/21.17

FOREIGN PATENT DOCUMENTS

CN 103166462 A 6/2013

OTHER PUBLICATIONS

Fairchild Semiconductor Corporation, "FAN6604 Highly Integrated Green-Mode PWM Controller," Jan. 2015.
Fairchild Semiconductor Corporation, "FSL336LR Green Mode Fairchild Buck Switch," Jan. 2015.

* cited by examiner

*Primary Examiner* — Timothy J. Dole
*Assistant Examiner* — Peter Novak
(74) *Attorney, Agent, or Firm* — Brake Hughes Bellermann LLP (57) ABSTRACT

In one general aspect, a control circuit for a power converter can include a feedback terminal configured to be coupled to a non-isolated feedback of the power converter when a feedback of the power converter is the non-isolated feedback, or configured to be coupled to a ground when the feedback of the power converter is an isolated feedback. The control circuit can include a detection circuit, coupled to the feedback terminal. The detection circuit can be configured to trigger a feedback voltage at the feedback terminal within an initial setting of the power converter. The feedback voltage can be high in response to the feedback terminal being coupled to the feedback of the power converter, and the feedback voltage can be low in response to the feedback terminal being coupled to the ground of the power converter.

20 Claims, 10 Drawing Sheets

CONTROL CIRCUIT FOR POWER CONVERTER WITH ISOLATED OR NON-ISOLATED FEEDBACK

RELATED APPLICATION

This application claims priority to and the benefit of Provisional Patent Application No. 62/375,982 filed on Aug. 17, 2016, which is incorporated herein by reference in its entirety.

TECHNICAL FIELD

Some implementations relate generally to power converters, particularly in a control circuit for power converters with isolated/non-isolated feedback.

BACKGROUND

Electronics devices are typically associated with power converters. There are two frequently used types of feedback power converters; isolated feedback and non-isolated feedback which include a control circuit. These control circuits monitor either a voltage or a current at the output terminal of the power converter in order to provide a regulated output voltage or current. Thus, a power converter with isolated feedback usually requires additional circuitry, such as a photo-coupler coupled to the feedback terminal to achieve regulation. However, a power converter with non-isolated feedback usually does not require the photo-coupler. Instead, an output voltage divider is directly coupled to the feedback terminal to achieve regulation.

Based on feedback regulation for isolated feedback and non-isolated feedback configurations described above, the isolated feedback regulation mechanism is different from the non-isolated feedback regulation mechanism. Specifically, the control circuit for isolated feedback is different from the control circuit for non-isolated feedback, and therefore the control circuit for isolated feedback cannot be used with the control circuit for non-isolated feedback, and vice versa.

SUMMARY

A control circuit for power converter with isolated or non-isolated feedback is disclosed that detects the isolated feedback or non-isolated feedback and further determines the regulation mechanism according to the result of the detection for improving usage flexibility.

DETAILED DESCRIPTION

The implementations, described herein are related to a control circuit for detecting an isolated feedback or non-isolated feedback application and further implementing regulation according to the result of the detection. This can result in improved flexibility of usage of power converters with isolated feedback and/or non-isolated feedback.

In order to make the structure and characteristics as well as the effectiveness of the implementations described herein to be further understood and recognized, the detailed description of the implementations described herein is provided as follows along with embodiments and accompanying figures.

Figure 1:
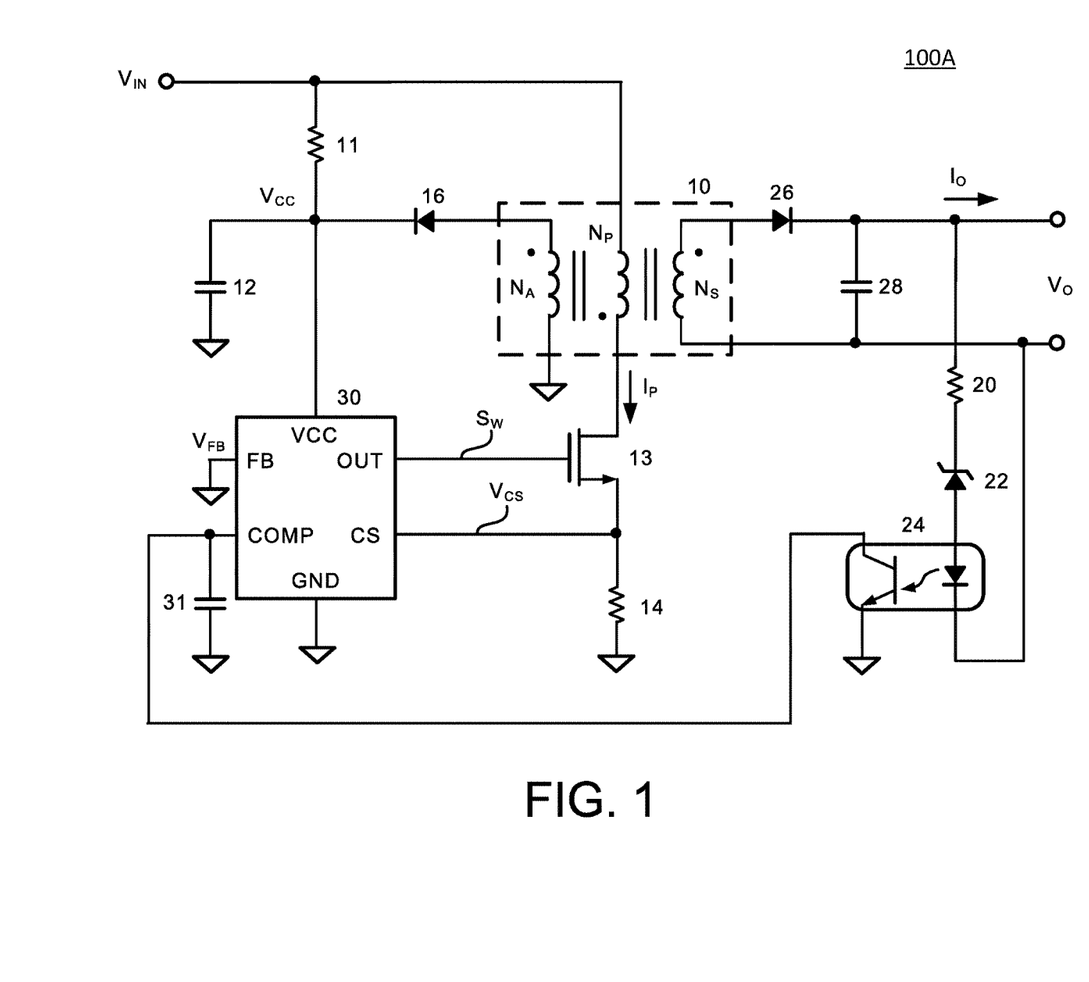
FIG. 1 shows a circuit diagram of an embodiment of the control circuit applied to the power converter with isolated feedback according to some implementations.

FIG. 1 shows a circuit diagram of an embodiment of a control circuit 30 applied to a power converter 100A with isolated feedback according to some implementations. The control circuit 30 includes a supply terminal VCC, an output terminal OUT, a current sense terminal CS, a feedback terminal FB, a compensation terminal COMP, and a ground terminal GND. A start resistor 11 is coupled between an input voltage VIN and a capacitor 12. The start resistor 11 and the capacitor 12 are further coupled to the supply terminal VCC of the control circuit 30. The input voltage VIN charges the capacitor 12 through the start resistor 11 for providing a supply voltage VCC to the supply terminal VCC. Once the supply voltage VCC reaches a start voltage VCC-START (as shown in FIG. 5B) (e.g., a start voltage threshold), the control circuit 30 will start to operate.

The control circuit 30 generates a switching signal SW at the output terminal OUT to switch a transformer 10 via a power transistor 13. The transformer 10 has a primary winding NP, a secondary winding NS, and an auxiliary winding NA. A first terminal of the primary winding NP is coupled to the input voltage VIN. The power transistor 13 is coupled to a second terminal of the primary winding NP to switch the transformer 10 for transferring the energy from the primary winding NP to the secondary winding NS and the auxiliary winding NA.

A switching current IP flows through the primary winding NP of the transformer 10. A current-sense device 14 (e.g., a current sense resistor) is coupled between the power transistor 13 and a ground in series for generating a current-sense signal VCS in response to the switching current IP. The current-sense device 14 is further coupled to current sense terminal CS of the control circuit 30. Thus, the control circuit 30 receives the current-sense signal VCS for generating the switching signal SW. The auxiliary winding NA of the transformer 10 is coupled to the control circuit 30 and the capacitor 12 through a diode 16. After the control circuit 30 starts operation, the auxiliary winding NA charges the capacitor 12 through the diode 16. The control circuit 30 adjusts the switching signal SW in accordance with the feedback for regulating the output (output voltage VO and/or output current IO) of the power converter 100A.

A resistor 20, a voltage-regulator 22, and a photo coupler 24 define the isolated feedback. A first terminal of the resistor 20 is coupled to an output terminal of the power converter 100A. The voltage-regulator 22 is coupled between a second terminal of the resistor 20 and the photo coupler 24. The photo coupler 24 is further coupled to the compensation terminal COMP of the control circuit 30. A compensation capacitor 31 is also coupled to the compensation terminal COMP. The voltage-regulator 22 can be a zener diode according to one implementation. A rectifier 26 and a capacitor 28 are coupled to the secondary winding NS of the transformer 10 for generating the output voltage VO of the power converter 100A. A ground may or may not be coupled to the capacitor 28. Further, once the control circuit 30, in some implementations, is applied to the power converter 100A with isolated feedback, the feedback terminal FB of the control circuit 30 is coupled to the ground.

Figure 2:
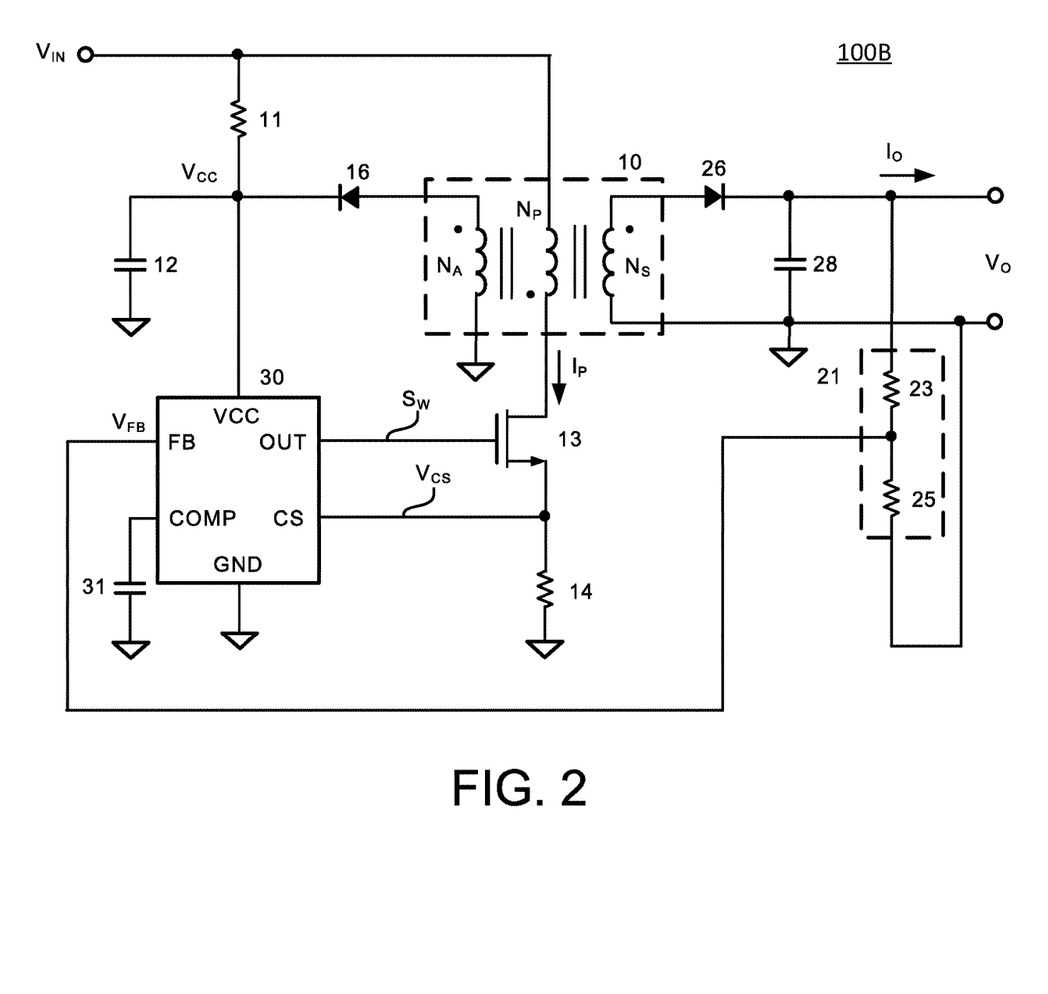
FIG. 2 shows a circuit diagram of an embodiment of the control circuit applied to the power converter with non-isolated feedback according to some implementations.

FIG. 2 shows a circuit diagram of an embodiment of the control circuit 30 applied to the power converter 100B with non-isolated feedback according to some implementations. Many of the elements of the power converter 100A in FIG. 1 are the same as the elements of the power converter 100B in FIG. 2. Accordingly, those similar or same elements are not described again in connection with this implementation. As shown in FIG. 2, the power converter 100B includes an output voltage divider 21 coupled to the output terminal of the power converter 100B for developing the non-isolated feedback. The output voltage divider 21 includes resistors 23 and 25, the resistor 23 is coupled to the resistor 25 in series. The output voltage divider 21 is directly coupled to the feedback terminal FB of the control circuit 30 to achieve feedback regulation. The power converter 100B of this embodiment doesn't have photo coupler 24 (shown in the power converter 100A), and therefore no photo coupler is coupled to the compensation terminal COMP of the control circuit 30. In this implementation, a ground is coupled to the capacitor 28.

Figure 3:
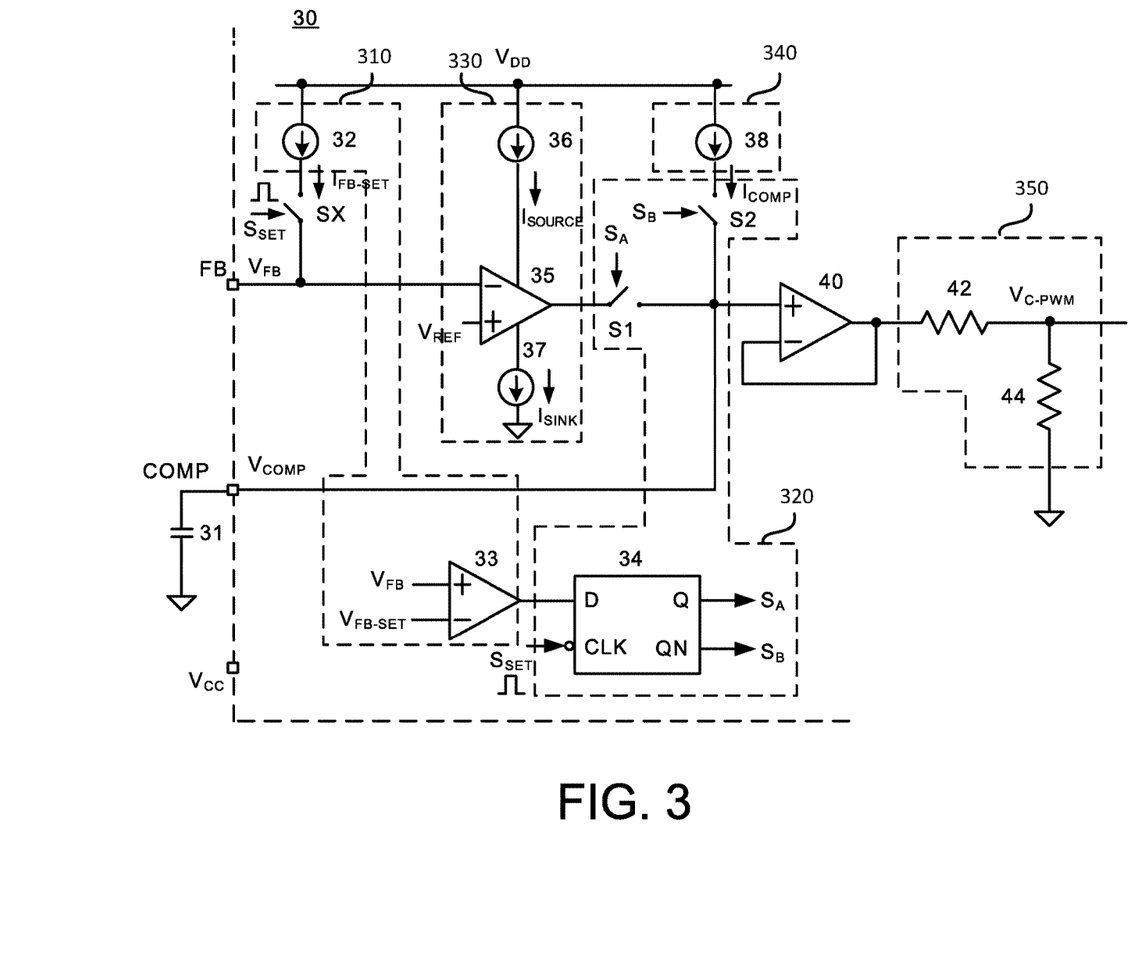
FIG. 3 shows a circuit diagram of an embodiment of the control circuit according to some implementations.

FIG. 3 shows a circuit diagram of an embodiment of the control circuit. The control circuit 30, or portions thereof, can be implemented in a controller. The control circuit 30 comprises a detection circuit 310, a switching circuit 320, a first feedback regulation circuit 330, and a second feedback regulation circuit 340. The compensation terminal COMP is externally coupled to the capacitor 31, and the feedback terminal FB is also externally coupled to the output voltage divider 21 (as shown in power converter 100B of FIG. 2) or the ground (as shown in the power converter 100A of FIG. 1).

The basic operation of the control circuit 30 is as follows. The detection circuit 310 has a feedback terminal FB configured to be coupled to a power converter (including either isolated feedback of power converter 100A of FIG. 1 or non-isolated feedback of power converter 100B of FIG. 2). The detection circuit 310 is configured to compare a feedback voltage from the power converter, with a threshold voltage, to determine whether the power converter includes isolated feedback or non-isolated feedback. If the power converter includes the non-isolated feedback, the switching circuit 320 is configured to trigger coupling of the first feedback regulation circuit 330 to the compensation terminal COMP. If the power converter includes the isolated feedback, the switching circuit 320 is configured to trigger coupling of the second feedback regulation circuit 340 to the compensation terminal COMP.

The detection circuit 310 includes a current source 32 and a comparator 33 and is coupled to the feedback terminal FB. The current source 32 is coupled between a supply voltage VDD and a first terminal of a switch SX. A second terminal of the switch SX is coupled to the feedback terminal FB and controlled by a setting signal SSET. The setting signal SSET is provided (enabled) in an initial setting of the power converter (e.g., the power converter 100A, 100B shown in FIGS. 1 and 2, respectively) to turn on the switch SX. The current source 32 generates a feedback sense current IFB-SET flowing out to the feedback terminal FB through the switch SX for detecting the type of the feedback. The positive terminal of the comparator 33 is coupled to the feedback terminal FB to receive the feedback voltage VFB. The negative terminal of the comparator 33 receives a threshold voltage VFB-SET. The comparator 33 compares the feedback voltage VFB with the threshold voltage VFB-SET.

Once the control circuit 30 (shown in FIG. 2) is applied to the power converter with non-isolated feedback (e.g., the power converter 100B shown FIG. 2), the feedback terminal FB is coupled to the output voltage divider 21 (as shown in FIG. 2), the feedback voltage VFB will be higher than the threshold voltage VFB-SET. Once the control circuit 30 is applied to the power converter with isolated feedback (e.g., the power converter 100A shown FIG. 1), the feedback terminal FB is coupled to the ground (as shown in FIG. 1), the feedback voltage VFB will be lower than the threshold voltage VFB-SET.

Accordingly, the detection circuit 310 provides the feedback sense current IFB-SET to the feedback terminal FB to generate the feedback voltage VFB for detecting the type of the feedback (isolated or non-isolated). The feedback voltage VFB is generated at the feedback terminal FB in an initial setting of the power converter, that is driven by the detection circuit 310.

In cases where the feedback of a power converter is the non-isolated feedback, the feedback terminal FB is coupled to the non-isolated feedback and the feedback voltage VFB is high. In cases where the feedback of a power converter is the isolated feedback, the feedback terminal FB is coupled to the ground and the feedback voltage VFB is low. Therefore, the detection circuit 310 detects the feedback voltage VFB to detect that the feedback of a power converter as including the isolated feedback or the non-isolated feedback.

The switching circuit 320 includes a flip-flop 34, a first switch S1, and a second switch S2. The first feedback regulation circuit 330 includes an error amplifier 35, a first current source 36, and a second current source 37. The second feedback regulation circuit 340 includes a current source 38.

The input terminal D of the flip-flop 34 is coupled to the output terminal of the comparator 33, the clock terminal CLK of the flip-flop 34 is coupled to receive the setting signal SSET, and the output terminals Q and QN of the flip-flop 34 output a first switching signal SA and a second switching signal SB, respectively. The first switch S1 is controlled by the first switching signal SA and coupled between the output terminal of the error amplifier 35 and the compensation terminal COMP. That is, the first switch S1 is coupled between the first feedback regulation 330 circuit and the compensation terminal COMP. The second switch S2 is controlled by the second switching signal SB and coupled between the current source 38 and the compensation terminal COMP. That is, the second switch S2 is coupled between the second feedback regulation circuit 340 and the compensation terminal COMP. Accordingly, the flip-flop 34 of the switching circuit 320 is controlled by the detection circuit 310 to generate the first switching signal SA and the second switching signal SB for switching the first switch S1 and the second switch S2.

The positive terminal of the error amplifier 35 receives a reference voltage VREF, and the negative terminal of the error amplifier 35 is coupled to the feedback terminal FB to receive the feedback voltage VFB. The first current source 36 generates a sourcing current ISOURCE and is coupled between the supply voltage VDD and the error amplifier 35. The second current source 37 generates a sinking current ISINK and is coupled between the error amplifier 35 and the ground. In some implementations, the error amplifier 35 can be a transconductance amplifier (Gm amp.) according to one implementation.

The current source 38 is coupled to the supply voltage VDD and generates a sourcing current ICOMP.

The control circuit 30 further includes a buffer 40 and a voltage divider 350 including resistors 42 and 44 for generating a PWM control signal VC-PWM in response to a compensation voltage VCOMP cross the capacitor 31. The PWM control signal VC-PWM is utilized to adjust the switching signal SW (as shown in FIG. 1) for regulating the output of the power converter. Therefore, the compensation voltage VCOMP is used for regulating the output of the power converter. The positive terminal of the buffer 40 is coupled to the compensation terminal COMP to receive the compensation voltage VCOMP cross the capacitor 31. The negative terminal of the buffer 40 is coupled to the output terminal of the buffer 40. The voltage divider 350 is coupled to the output terminal of the buffer 40. The first terminal of the resistor 42 is coupled to the output terminal of the buffer 40, and the resistor 44 is coupled between the second terminal of the resistor 42 and the ground.

Figure 4:
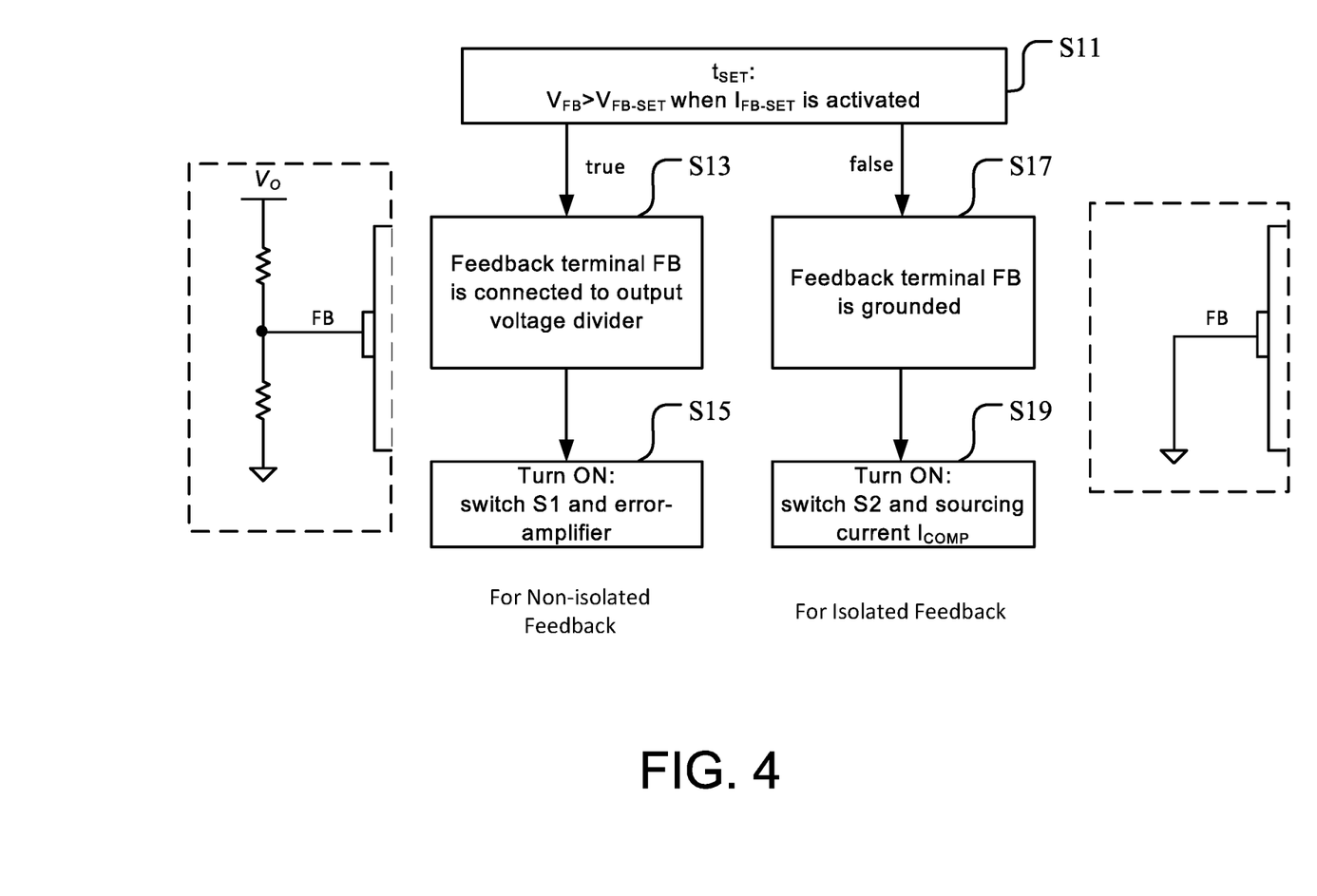
FIG. 4 shows a flowchart of an embodiment of the control process of the control circuit according to some implementations.

FIG. 4 shows a flowchart of an embodiment of the control process of the control circuit 30 according to some implementations. The flowchart illustrates selection process for the control circuit 30 to either perform isolated feedback regulation mechanism or non-isolated feedback regulation mechanism.

Firstly, the control circuit 30 detects the type of the feedback, the setting signal SSET is enabled to turn on the switch SX for activating the feedback sense current IFB-SET that flows out to the feedback terminal FB. The control circuit 30 (e.g., the detection circuit 310 of the control circuit 30) detects if the feedback voltage VFB is greater than the threshold voltage VFB-SET when the feedback sense current IFB-SET is activated within a time period tSET that is enabled time period of the setting signal SSET (as shown in S11).

If the feedback voltage VFB is greater than the threshold voltage VFB-SET within the time period tSET, which indicates that the feedback terminal FB is connected to the output voltage divider (as shown in S13), and the feedback of the power converter is the non-isolated feedback. Then, the control circuit 30 (e.g., the switching circuit 320 of the control circuit 30) turns on (e.g., closes) the first switch S1, which indicates that the error amplifier 35 (within the first feedback regulation circuit 330) is activated to provide the sourcing current ISOURCE and the sinking current ISINK to the capacitor 31 at the compensation terminal COMP for performing non-isolated feedback regulation (as shown in S15). In the meantime, the second switch S2 is turned off (e.g., opened), which indicates that the current source 38 is deactivated.

If the feedback voltage VFB is lower than the threshold voltage VFB-SET within the time period tSET, which indicates that the feedback terminal FB is grounded (as shown in S17), and the feedback of the power converter is isolated feedback. Then, the control circuit 30 (e.g., the switching circuit 320 of the control circuit 30) turns on the second switch S2, which indicates that the current source 38 (within the second feedback regulation circuit 340) is activated to provide the sourcing current ICOMP to the capacitor 31 at the compensation terminal COMP for performing isolated feedback regulation (as shown in S19). In the meantime, the first switch S1 is turned off, which indicates that the error amplifier 35 is deactivated. Accordingly, the control circuit 30 determines the isolated feedback regulation mechanism or non-isolated feedback regulation mechanism according to whether the feedback voltage VFB is greater than the threshold voltage VFB-SET when the feedback sense current IFB-SET that flows out to the feedback terminal FB is activated within the time period tSET.

Figure 5A:
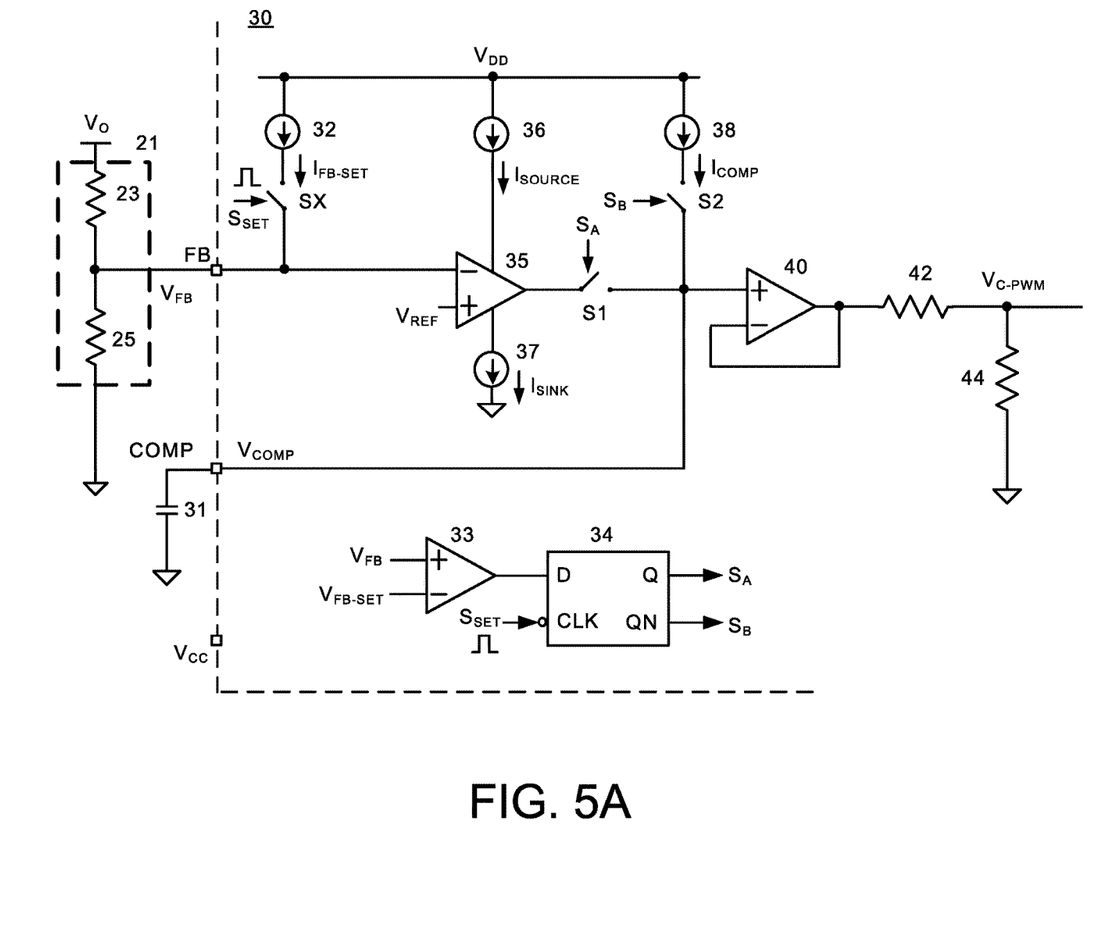
FIG. 5A shows a circuit diagram of an embodiment of the control circuit applied to non-isolated feedback according to some implementations.
Figure 5B:
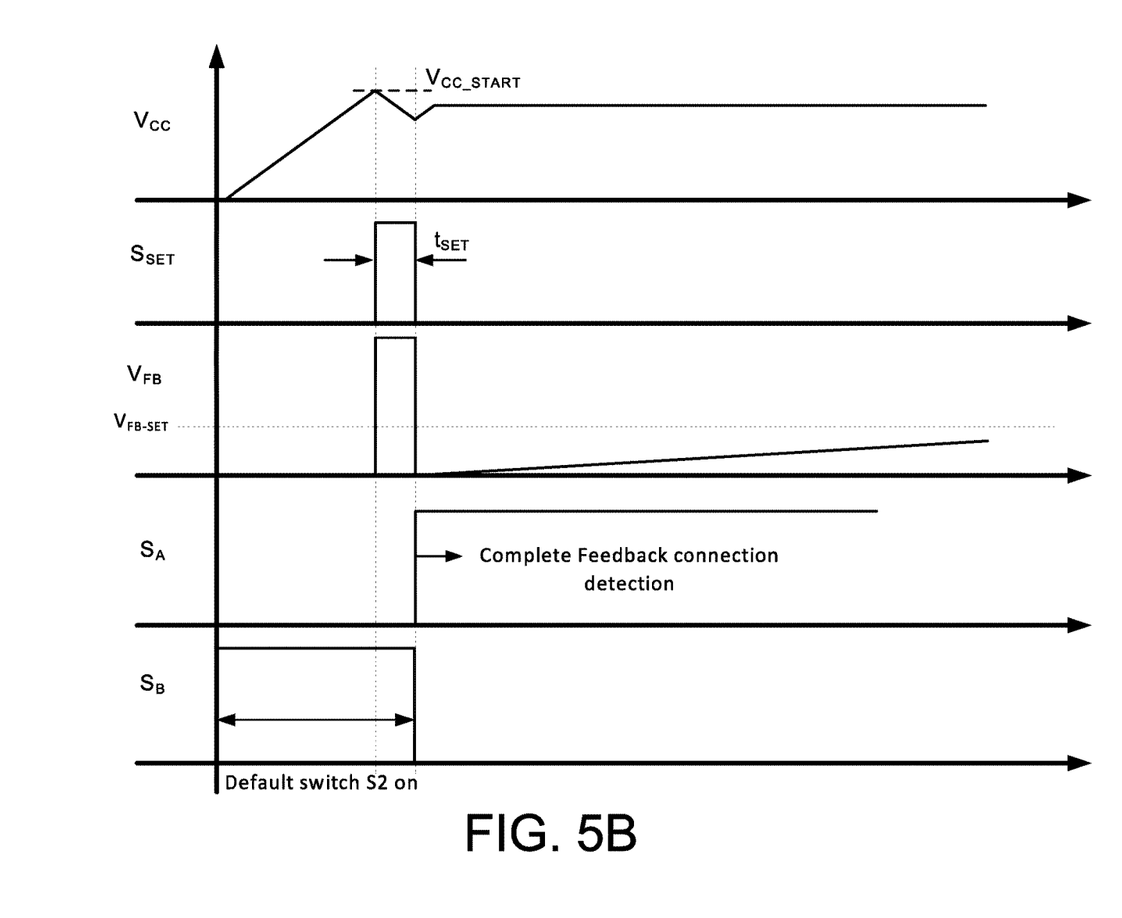
FIG. 5B shows waveforms of an embodiment of the control circuit detecting non-isolated feedback and deciding non-isolated feedback regulation mechanism within the initial setting according to some implementations.

FIG. 5A shows a circuit diagram of an embodiment of the control circuit (e.g., control circuit 30) applied to non-isolated feedback according to some implementations. As shown in FIG. 5A, the feedback terminal FB of the control circuit 30 is externally coupled to the output voltage divider 21 which is the non-isolated feedback. The compensation terminal COMP of the control circuit 30 is externally coupled to the capacitor 31 to generate the compensation voltage VCOMP for feedback regulation.

FIG. 5B shows waveforms of an embodiment of the control circuit detecting non-isolated feedback and determining the non-isolated feedback regulation mechanism within the initial setting according to some implementations. The feedback setting is activated when the supply voltage VCC reaches the start voltage VCC-START and the control circuit 30 is started. During the initial setting phase of the power converter, the control circuit 30 detects what kind of external circuitry is connected to the feedback terminal FB and determines its feedback regulation mechanism. The setting signal SSET is enabled and the feedback sense current IFB-SET flows out to the feedback terminal FB when the supply voltage VCC reaches the start voltage VCC-START. The second switching signal SB will be enabled and the first switching signal SA will be disabled before setting signal SSET is disabled as default. In some embodiments, the first switching signal SA will be enabled and the second switching signal SB will be disabled when setting signal SSET is disabled.

The output voltage divider 21 is connected to the feedback terminal FB, and the photo coupler 24 isn't coupled to the compensation terminal COMP. The control circuit 30 detects that the feedback voltage VFB of the feedback terminal FB is greater than the threshold voltage VFB-SET due to the feedback sense current IFB-SET flowing to the resistor 25 of the output voltage divider 21 through the feedback terminal FB within time period tSET. The second switching signal SB, in some implementations, will be disabled, and the first switching signal SA will be enabled when the setting signal SSET is disabled. That is, in some implementations, the second switch S2 will be turned off, and the first switch S1 is turned on (e.g., closed) when the setting signal SSET is disabled. Therefore, in some implementations, the error amplifier 35 is activated to provide the sourcing current ISOURCE or the sinking current ISINK to the capacitor 31 at the compensation terminal COMP for performing non-isolated feedback regulation for regulating the output voltage and/or the output current.

The sourcing current ISOURCE and the sinking current ISINK are used to modulate the compensation voltage VCOMP for performing non-isolated feedback regulation. If the output current IO is increased, in some implementations, the output voltage VO is decreased, and the feedback voltage VFB is also decreased. The sourcing current ISOURCE is provided to the compensation terminal COMP to charge the capacitor 31 for increasing the compensation voltage VCOMP. Then, in some implementations, the PWM control signal VC-PWM is generated according to the increased compensation voltage VCOMP to increase the duty of the switching signal SW for increasing the output voltage VO. If the output current IO is decreased, the output voltage VO is increased, and the feedback voltage VFB is also increased. The sinking current ISINK is provided to the compensation terminal COMP to discharge the capacitor 31 for decreasing the compensation voltage VCOMP. Then, in some implementations, the PWM control signal VC-PWM is generated according to the decreased compensation voltage VCOMP to decrease the duty of the switching signal SW for decreasing the output voltage VO.

Figure 6A:
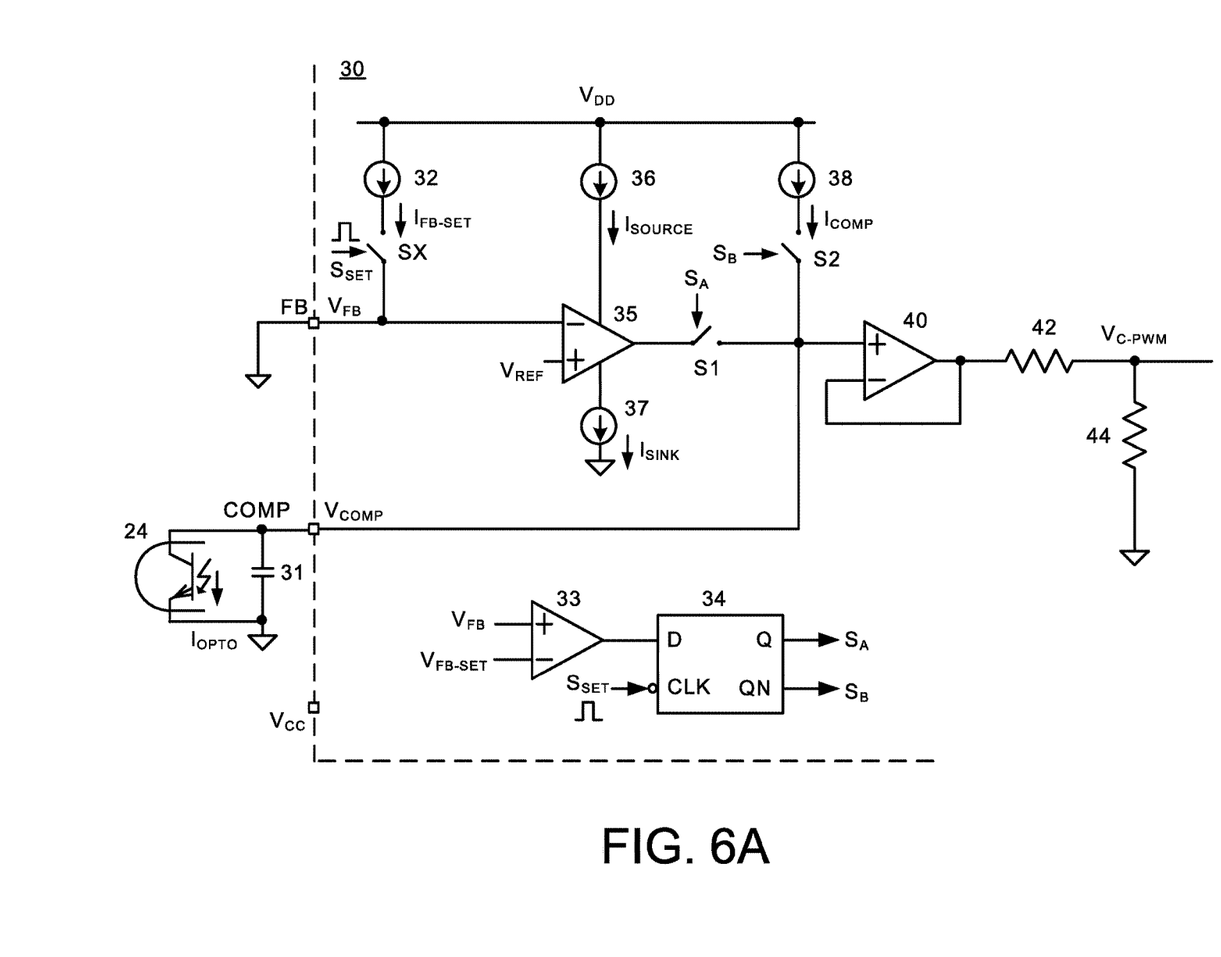
FIG. 6A shows a circuit diagram of an embodiment of the control circuit applied to isolated feedback according to some implementations.

FIG. 6A shows a circuit diagram of an embodiment of the control circuit applied to isolated feedback according to some implementations. As shown in FIG. 6A, the feedback terminal FB of the control circuit 30 is externally coupled to the ground, and the compensation terminal COMP of the control circuit 30 is externally coupled to the capacitor 31 and the photo-coupler 24. That is, in some implementations, the feedback of the power converter is isolated feedback.

Figure 6B:
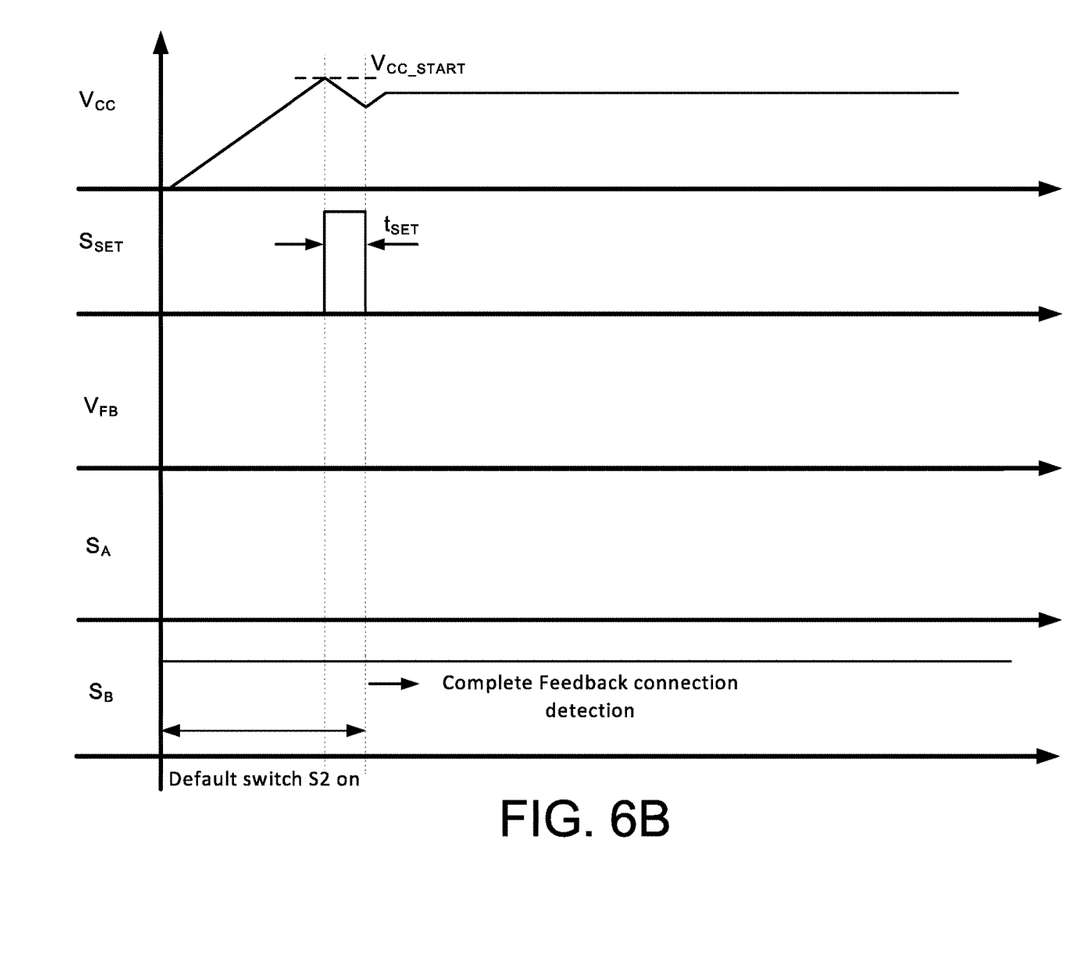
FIG. 6B shows waveforms of an embodiment of the control circuit detecting isolated feedback and deciding isolated feedback regulation mechanism within the initial setting according to some implementations.

FIG. 6B shows waveforms of an embodiment of the control circuit detecting isolated feedback and determining isolated feedback regulation mechanism within the initial setting according to some implementations. The feedback setting is activated when the supply voltage VCC reaches the start voltage VCC-START and the control circuit 30 is started. During the initial setting phase of the power converter, the control circuit 30 detects what kind of external circuitry is connected to the feedback terminal FB and determines its feedback regulation mechanism. The setting signal SSET is enabled and the feedback sense current IFB-SET flows out to the feedback terminal FB when the supply voltage VCC reaches the start voltage VCC-START. The second switching signal SB will be enabled and the first switching signal SA will be disabled before the setting signal SSET is disabled as default.

Because the feedback terminal FB is grounded, in some implementations, the feedback voltage VFB of the feedback terminal FB is lower than the threshold voltage VFB-SET within time period tSET. The second switching signal SB will keep to be enabled, and the first switching signal SA will keep to be disabled when the setting signal SSET is disabled. That is, in some implementations, the second switch S2 will be turned on (and maintained in that state), and the first switch S1 will be turned off (and maintained in that state) when the setting signal SSET is disabled. The current source 38 is activated to provide the sourcing current ICOMP to charge the capacitor 31 at the compensation terminal COMP for generating the compensation voltage VCOMP. Further, the photo-coupler 24 provides the sinking current IOPTO to the capacitor 31 at the compensation terminal COMP. The sinking current IOPTO is correlated to the output voltage VO of the power converter. The sourcing current ICOMP and the sinking current IOPTO provided by the photo-coupler 24 are used to modulate the compensation voltage VCOMP for performing isolated feedback regulation for regulating the output of the power converter.

If the output current IO is increased, in some implementations, the output voltage VO is decreased, and the sinking current IOPTO is also decreased. In response to the sinking current IOPTO being decreased, the compensation voltage VCOMP is increased. Then, in some implementations, the PWM control signal VC-PWM is generated according to the increased compensation voltage VCOMP to increase the duty of the switching signal SW for increasing the output voltage VO. If the output current IO is decreased, in some implementations, the output voltage VO is increased, and the sinking current IOPTO is also increased. In response to the sinking current IOPTO being increased, the compensation voltage VCOMP is decreased. Then, in some implementations, the duty of the switching signal SW is decreased for decreasing the output voltage VO.

Figure 7A:
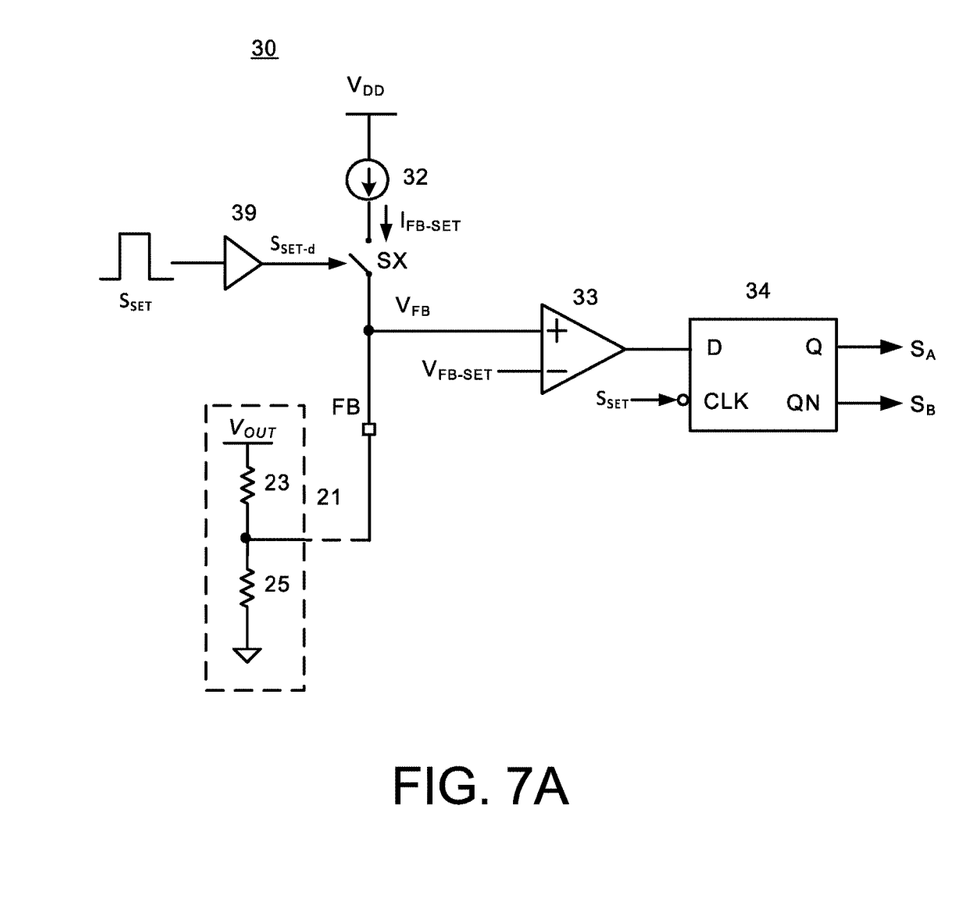
FIG. 7A shows a circuit diagram of another embodiment of the control circuit according to some implementations.
Figure 7B:
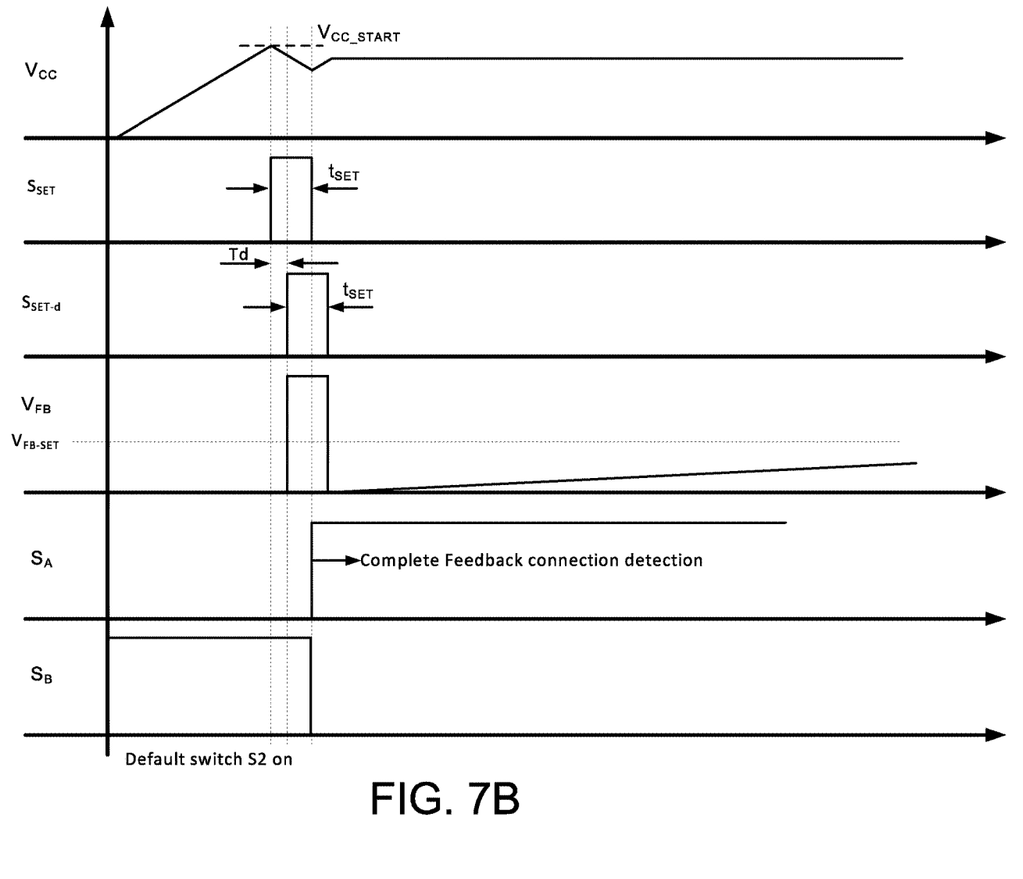
FIG. 7B shows waveforms of another embodiment of the control circuit detecting non-isolated feedback and deciding non-isolated feedback regulation mechanism within the initial setting according to some implementations.

FIG. 7A shows a circuit diagram of another embodiment of the control circuit according to some implementations. As shown in FIG. 7A, the control circuit 30 further includes a delay circuit 39 which can be a buffer according to some implementations. The other circuits of the control circuit 30 of this embodiment are the same as the circuits shown in FIG. 3, and therefore part circuits of this embodiment are not shown in FIG. 7A. The waveforms are shown in FIG. 7B. The delay circuit 39 receives and delays the setting signal SSET for a delay time Td to generate a delayed setting signal SSET-d for controlling the switch SX. In some implementations, there is a time delay for feedback sense current IFB-SET flowing out to the feedback terminal FB. The delay time Td can ensure switch SX still been turned on and the feedback sense current IFB-SET is still flowing out to feedback terminal FB when the setting signal SSET is disabled. Therefore, the feedback voltage VFB compared with the threshold voltage VFB-SET by the control circuit 30 is correct when the setting signal SSET is disabled.

In one general aspect, a control circuit for a power converter can include a feedback terminal configured to be coupled to a non-isolated feedback of the power converter when a feedback of the power converter is the non-isolated feedback, or configured to be coupled to a ground when the feedback of the power converter is an isolated feedback. The control circuit can include a detection circuit, coupled to the feedback terminal where the detection circuit is configured to trigger a feedback voltage at the feedback terminal within an initial setting of the power converter. The feedback voltage can be high in response to the feedback terminal being coupled to the feedback of the power converter, and the feedback voltage can be low in response to the feedback terminal being coupled to the ground of the power converter.

In some implementations, the detection circuit can detect the feedback voltage to determine whether the power converter includes the isolated feedback or the non-isolated feedback. In some implementations, the detection circuit can compare the feedback voltage with a threshold voltage to determine whether the power converter includes the isolated feedback or the non-isolated feedback.

In some implementations, the control circuit can include a compensation terminal. The control circuit can be configured to generate a compensation voltage at the compensation terminal for regulating an output of the power converter. In some implementations, the control circuit can include a switching circuit coupled to the compensation terminal and controlled by the detection circuit.

In some implementations, the control circuit can include a first feedback regulation circuit, and a second feedback regulation circuit. The first feedback regulation circuit can be coupled to the compensation terminal through the switching circuit when the feedback voltage is high, and the second feedback regulation circuit can be coupled to the compensation terminal through the switching circuit when the feedback voltage is low.

In some implementations, the control circuit can include a first feedback regulation circuit configured to modulate the compensation voltage. In some implementations, the control circuit can include a second feedback regulation circuit configured to generate the compensation voltage. In some implementations, the control circuit can include the first feedback regulation circuit which is coupled to the compensation terminal through the switching circuit when the feedback voltage is high. The second feedback regulation circuit can be coupled to the compensation terminal through the switching circuit when the feedback voltage is low.

In another general aspect, a control circuit can include a detection circuit having a feedback terminal configured to be coupled to a power converter and a compensation terminal configured to be coupled to the power converter. The detection circuit is configured to determine whether the power converter includes isolated feedback or non-isolated feedback. The control circuit can include a first feedback regulation circuit, and a second feedback regulation circuit. The control circuit can include a switching circuit configured to trigger coupling of the first feedback regulation circuit to the power converter, via the compensation terminal, in response to a determination that the power converter includes non-isolated feedback. The switching circuit can be configured to trigger coupling of the second feedback regulation circuit to the power converter, via the compensation terminal, in response to a determination that the power converter includes isolated feedback.

In some implementations, the detection circuit is configured to compare a feedback voltage associated with the power converter with a threshold voltage to determine whether the power converter includes isolated feedback or non-isolated feedback. In some implementations, the first feedback regulation circuit is coupled to the compensation terminal through the switching circuit when the feedback voltage is high.

In some implementations, the second feedback regulation circuit is coupled to the compensation terminal through the switching circuit when the feedback voltage is low. In some implementations, the first feedback regulation circuit includes an error amplifier configured to provide a current to the compensation terminal for non-isolated feedback regulation. In some implementations, the second feedback regulation circuit includes a current source configured to provide a current to the compensation terminal. In some implementations, the detection circuit is configured to determine that the power converter includes non-isolated feedback when the feedback voltage is above the threshold voltage within a specified time period.

In one general aspect, a control circuit can include a detection circuit having a feedback terminal and a compensation terminal configured to be coupled to the power converter. The detection circuit can be configured to determine whether the power converter includes isolated feedback or non-isolated feedback. The control circuit can include a first feedback regulation circuit, a second feedback regulation circuit, and a switching circuit. The first feedback regulation circuit can be coupled to the compensation terminal via the switching circuit in response to a determination that the power converter includes non-isolated feedback. The second feedback regulation circuit can be coupled to the compensation terminal via the switching circuit in response to a determination that the power converter includes isolated feedback.

In some implementations, the first feedback regulation circuit includes an error amplifier and at least one current source. In some implementations, the second feedback regulation circuit includes a current source. In some implementations, the detection circuit includes a comparator and a current source.

It will also be understood that when an element, such as a transistor or resistor, is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element or layer, there are no intervening elements or layers present. Although the terms directly on, directly connected to, or directly coupled to may not be used throughout the detailed description, elements that are shown as being directly on, directly connected or directly coupled can be referred to as such. The claims of the application (if included) may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

Implementations of the various techniques described herein may be implemented in (e.g., included in) digital electronic circuitry, or in computer hardware, firmware, software, or in combinations of them. Portions of methods also may be performed by, and an apparatus may be implemented as, special purpose logic circuitry, e.g., an FPGA (field programmable gate array) or an ASIC (application-specific integrated circuit).

Implementations may be implemented in a computing system that includes an industrial motor driver, a solar inverter, ballast, a general-purpose half-bridge topology, an auxiliary and/or traction motor inverter driver, a switching mode power supply, an on-board charger, an uninterruptible power supply (UPS), a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Some implementations may be implemented using various semiconductor processing and/or packaging techniques. Some implementations may be implemented using various types of semiconductor processing techniques associated with semiconductor substrates including, but not limited to, for example, Silicon (Si), Galium Arsenide (GaAs), Galium Nitride (GaN), and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A control circuit for a power converter with isolated feedback or a power converter with non-isolated feedback, the control circuit comprising:
    a feedback terminal configured to be coupled to a non-isolated feedback from a secondary side of a transformer of the power converter when the control circuit is applied to the power converter with non-isolated feedback, and configured to be coupled to a ground when the control circuit is applied to the power converter with isolated feedback; and
    a detection circuit, coupled to the feedback terminal, the detection circuit configured to trigger a feedback voltage at the feedback terminal within an initial setting of the power converter,
    the feedback voltage being high in response to the feedback terminal being coupled to the non-isolated feedback from a secondary side of the transformer of the power converter,
    the feedback voltage being low in response to the feedback terminal being coupled to the ground of the power converter.

2. The control circuit of claim 1, wherein the detection circuit detects the feedback voltage to determine whether the power converter includes the isolated feedback or the non-isolated feedback from the secondary side of the transformer.

3. The control circuit of claim 1, wherein the detection circuit compares the feedback voltage with a threshold voltage to determine whether the power converter includes the isolated feedback or the non-isolated feedback from the secondary side of the transformer.

4. The control circuit of claim 1, further comprising:
    a compensation terminal,
    the control circuit configured to generate a compensation voltage at the compensation terminal for regulating an output of the power converter.

5. The control circuit of claim 4, further comprising:
    a switching circuit coupled to the compensation terminal and controlled by the detection circuit.

6. The control circuit of claim 5, further comprising:
    a first feedback regulation circuit; and
    a second feedback regulation circuit,
    the first feedback regulation circuit being coupled to the compensation terminal through the switching circuit when the feedback voltage is high,
    the second feedback regulation circuit being coupled to the compensation terminal through the switching circuit when the feedback voltage is low.

7. The control circuit of claim 4, further comprising:
    a first feedback regulation circuit configured to modulate the compensation voltage.

8. The control circuit of claim 7, further comprising:
    a second feedback regulation circuit configured to generate the compensation voltage.

9. The control circuit of claim 8, wherein the first feedback regulation circuit is coupled to the compensation terminal through a switching circuit when the feedback voltage is high, and the second feedback regulation circuit is coupled to the compensation terminal through the switching circuit when the feedback voltage is low.

10. A control circuit, comprising:
    a detection circuit having a feedback terminal configured to be coupled to a power converter and a compensation terminal configured to be coupled to the power converter, the detection circuit configured to determine whether the power converter includes isolated feedback from a secondary side of a transformer of the power converter or non-isolated feedback from the secondary side of the transformer of the power converter;
    a first feedback regulation circuit;
    a second feedback regulation circuit; and
    a switching circuit configured to trigger coupling of the first feedback regulation circuit to the power converter, via the compensation terminal, in response to a determination that the power converter includes non-isolated feedback from the secondary side of the transformer of the power converter,
    the switching circuit configured to trigger coupling of the second feedback regulation circuit to the power converter, via the compensation terminal, in response to a determination that the power converter includes isolated feedback from the secondary side of the transformer of the power converter.

11. The control circuit of claim 10, wherein the detection circuit is configured to compare a feedback voltage associated with the power converter with a threshold voltage to determine whether the power converter includes isolated feedback from the secondary side of the transformer of the power converter or non-isolated feedback from the secondary side of the transformer of the power converter.

12. The control circuit of claim 11, wherein the first feedback regulation circuit is coupled to the compensation terminal through the switching circuit when the feedback voltage is high.

13. The control circuit of claim 11, wherein the second feedback regulation circuit is coupled to the compensation terminal through the switching circuit when the feedback voltage is low.

14. The control circuit of claim 10, wherein the first feedback regulation circuit includes an error amplifier configured to provide a current to the compensation terminal for non-isolated feedback regulation.

15. The control circuit of claim 10, wherein the second feedback regulation circuit includes a current source configured to provide a current to the compensation terminal.

16. The control circuit of claim 10, wherein the detection circuit is configured to determine that the power converter includes non-isolated feedback when a feedback voltage is above a threshold voltage within a specified time period.

17. A control circuit, comprising:
    a detection circuit having a feedback terminal and a compensation terminal configured to be coupled to a power converter, the detection circuit configured to determine whether the power converter includes isolated feedback or non-isolated feedback;
    a first feedback regulation circuit;
    a second feedback regulation circuit; and
    a switching circuit,
    the first feedback regulation circuit being coupled to the compensation terminal via the switching circuit in response to a determination that the power converter includes non-isolated feedback from a secondary side of a transformer of the power converter, the second feedback regulation circuit being coupled to the compensation terminal via the switching circuit in response to a determination that the power converter includes isolated feedback from the secondary side of the transformer of the power converter.

18. The control circuit of claim 17, wherein the first feedback regulation circuit includes an error amplifier and at least one current source.

19. The control circuit of claim 17, wherein the second feedback regulation circuit includes a current source.

20. The control circuit of claim 17, wherein the detection circuit includes a comparator and a current source.

* * * * *